(12) United States Patent
Yadav

(10) Patent No.: US 10,163,358 B2
(45) Date of Patent: Dec. 25, 2018

(54) METHOD AND SYSTEM FOR STUDENT PROJECT MANAGEMENT

(71) Applicant: Chethan Yadav, Atlanta, GA (US)

(72) Inventor: Chethan Yadav, Atlanta, GA (US)

( * ) Notice: Subject to any disclaimer, the term of this patent is extended or adjusted under 35 U.S.C. 154(b) by 449 days.

(21) Appl. No.: 14/862,828

(22) Filed: Sep. 23, 2015

(65) Prior Publication Data

US 2017/0084184 A1   Mar. 23, 2017

(51) Int. Cl.
*G09B 5/02* (2006.01)
*G09B 19/00* (2006.01)

(52) U.S. Cl.
CPC .............. *G09B 5/02* (2013.01); *G09B 19/00* (2013.01)

(58) Field of Classification Search
CPC .................... G06Q 50/205; G06Q 50/2053
See application file for complete search history.

(56) References Cited

U.S. PATENT DOCUMENTS

| | | | |
|---|---|---|---|
| 6,288,753 B1 | 9/2001 | DeNicola et al. | |
| 6,652,287 B1 * | 11/2003 | Strub | G09B 5/00 434/322 |
| 2002/0055089 A1 * | 5/2002 | Scheirer | G09B 7/02 434/350 |
| 2003/0064355 A1 * | 4/2003 | Florance | G06Q 10/10 434/362 |
| 2003/0124493 A1 | 7/2003 | Kulack | |
| 2004/0153509 A1 * | 8/2004 | Alcorn | G06Q 30/06 709/205 |
| 2005/0014122 A1 * | 1/2005 | Ruvinsky | G09B 7/02 434/350 |
| 2009/0077190 A1 | 3/2009 | Gupta | |
| 2012/0137226 A1 * | 5/2012 | Jenkins | G06Q 10/06 715/745 |
| 2012/0264099 A1 * | 10/2012 | Craft, IV | G09B 7/02 434/350 |
| 2013/0330704 A1 * | 12/2013 | Creamer | G09B 7/00 434/362 |
| 2014/0101068 A1 * | 4/2014 | Gidugu | G09B 7/02 705/327 |

(Continued)

OTHER PUBLICATIONS

International Search Report and Written Opinion, dated Dec. 5, 2016, in connection with International Application No. PCT/US2016/053314.

*Primary Examiner* — Nathan Hillery
(74) *Attorney, Agent, or Firm* — Meunier Carlin & Curfman LLC

(57) ABSTRACT

Described herein is a method and a system of student activity management comprising receiving a plurality of information related to one or more activities of a student in an educational system; storing at least a portion of the information in one or more files, wherein the information is stored based on the activity the information is related to and the content of the information; applying at least a portion of the received information to a calendar function, wherein the at least a portion of received information applied to the calendar function is used to create a timeline for completing at least one activity of the student; applying one or more tools to at least a portion of the information; tracking progress made toward completion of the at least one activity; and providing alerts to at least the student regarding the progress made toward completion of the at least one activity.

12 Claims, 5 Drawing Sheets

(56) References Cited

U.S. PATENT DOCUMENTS

2015/0006423 A1    1/2015  Steven et al.
2017/0046964 A1*  2/2017  Karpoff .................... G09B 5/00
2017/0046966 A1*  2/2017  Velasquez ................ G09B 7/02

* cited by examiner

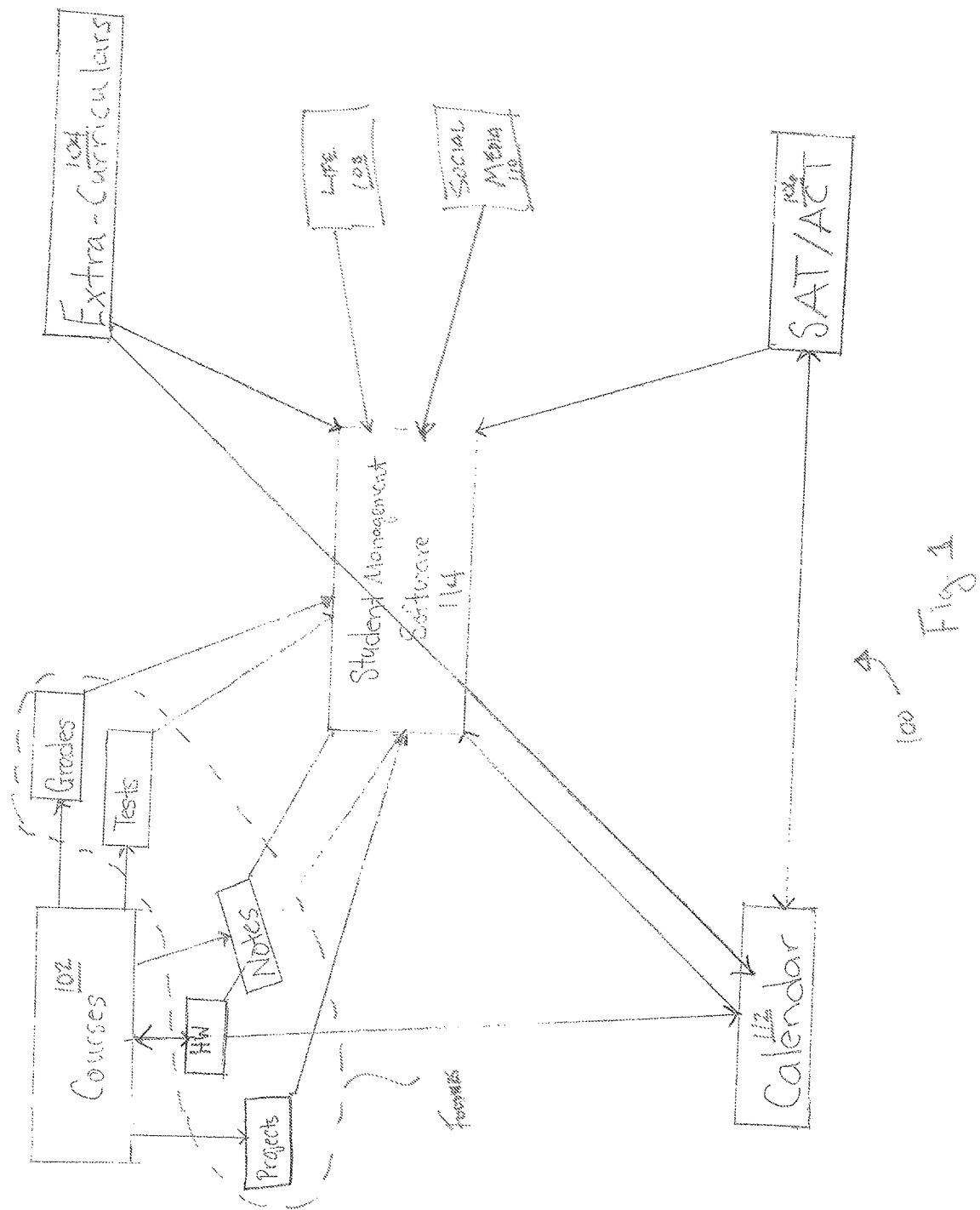

METHOD AND SYSTEM FOR STUDENT PROJECT MANAGEMENT

BACKGROUND

Today's students are busier than ever. Credits required to graduate from high school are constantly being raised as are the thresholds for admittance into colleges and universities. While grades are as important as ever for admission into top post-secondary institutions, students are also expected to participate and take leadership positions many extra-curricular activities. Today's students do have a plethora of technology, both in the hardware and software domains at their disposal for academic and extracurricular activities. For example, there are calendars, spreadsheets, email, texting, laptop computers, tablet computers, cellular/smart phones, teleconferencing, video conferencing, SafeAssign™, Blackboard™, etc. Teachers and instructors post assignments, syllabus, grading scales, test prep information, office hours and other pertinent information in their personal websites or school-sponsored websites. However, until now, all of these resources are discrete and disparate, requiring a student (or caregiver) to access multiple programs on various platforms. While the student can keep a calendar, either electronically or manually, to track all of his or her various technologies, there is not an integrated solution that automatically populates a calendar, schedules prep time of events and activities and establishes a schedule for the student and others involved with a project.

Therefore, what is needed is a consolidated, convenient, user-friendly method and system to bring various resources, both software and hardware, together to aide today's students in managing their academic and extra-curricular projects and activities.

SUMMARY

Described herein is a method and a system of student activity management. In one aspect, a method is described. The method comprises receiving a plurality of information, wherein the received information is related to one or more activities of a student in an educational system; storing at least a portion of the information in one or more files, wherein the information is stored based on the activity the information is related to and the content of the information; applying at least a portion of the received information to a calendar function, wherein the at least a portion of received information applied to the calendar function is used to create a timeline for completing at least one activity of the student; applying one or more tools to at least a portion of the information; tracking progress made toward completion of the at least one activity; and providing alerts to at least the student regarding the progress made toward completion of the at least one activity. Storing at least a portion of the information in one or more files can comprise storing the information in one or more modules comprising a courses module, an Extra-Curricular module, an Educational Goals module, a Life module, a Social module, and a Calendar module, wherein each module further comprises folders, files, and tools. The calendar module can comprise the calendar function, and information from each of the other modules is used to populate the calendar function. The timeline for completing the at least one activity of the student can comprise creating a critical path schedule for completing the at least one activity of the student. The courses module includes a project manager tool, wherein using the project manager tool the student can define a project, assign tasks to one or more other students associated with the project, create an overall schedule for completing the assigned tasks, create a schedule specific to the student and each of the one or more other students associate with the project, and electronically send the assigned task and each student's specific schedule to respective students. The project manager tool can track progress of each student's assigned task and update the overschedule and the specific schedules to reflect the progress. The overall schedule and each of the specific schedules can be created automatically by the project manager tool based on a completion date of the project and each student's availability. The educational goals module can include a tool that allows the student to enter an educational goal and track progress toward and likelihood of success of accomplishing the educational goal. The educational goal may be admission to a desired college or university. Progress toward and likelihood of success of accomplishing the educational goal can be visually displayed to the student. Information from one or more other modules can be used to automatically determine and update progress toward and likelihood of success of accomplishing the educational goal. The courses module can include a tool that allows the student to videoconference with an instructor.

The system comprises a memory, wherein the memory comprises computer-executable code; and a processor for executing the computer-executable code. The computer-executable code causing the processor to: receive a plurality of information, wherein the received information is related to one or more activities of a student in an educational system; store at least a portion of the information in one or more files, wherein the information is stored based on the activity the information is related to and the content of the information; apply at least a portion of the received information to a calendar function, wherein the at least a portion of received information applied to the calendar function is used to create a timeline for completing at least one activity of the student; apply one or more tools to at least a portion of the information; track progress made toward completion of the at least one activity; and provide alerts to at least the student regarding the progress made toward completion of the at least one activity. The processor and the memory can comprise a first platform, and the plurality of information can be received from at least a second platform. The second platform can comprise a smart phone. The first platform can comprise a personal computer. Storing at least a portion of the information in one or more files can comprise storing the information in one or more modules comprising a courses module, an Extra-Curricular module, an Educational Goals module, a Life module, a Social module, and a Calendar module, wherein each module further comprises folders, files, and tools. The calendar module can comprise the calendar function, and information from each of the other modules can be used to populate the calendar function. The timeline for completing the at least one activity of the student can comprise creating a critical path schedule for completing the at least one activity of the student. The courses module can include a project manager tool, wherein using the project manager tool the student can define a project, assign tasks to one or more other students associated with the project, create an overall schedule for completing the assigned tasks, create a schedule specific to the student and each of the one or more other students associate with the project, and electronically send the assigned task and each student's specific schedule to respective students. The project manager tool can track progress of each student's assigned task and update the overschedule and the specific schedules to reflect the progress. The overall schedule and each of the specific schedules can be created automatically by the project manager tool based on a completion date of the project and each student's availability. The educational goals module can include a tool that allows the student to enter an educational goal and track progress toward and likelihood of success of accomplishing the educational goal. The educational goal can be admission to a desired college or university. The system can further comprise a graphical user interface in communication with the processor, wherein progress toward and likelihood of success of accomplishing the educational goal is visually displayed to the student on the graphical user interface. Information from one or more other modules can be used to automatically determine and update progress toward and likelihood of success of accomplishing the educational goal. The courses module can include a tool that allows the student to videoconference with an instructor.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 illustrates an embodiment of a student project management system comprising a plurality of modules;

DETAILED DESCRIPTION

Figure 2A:
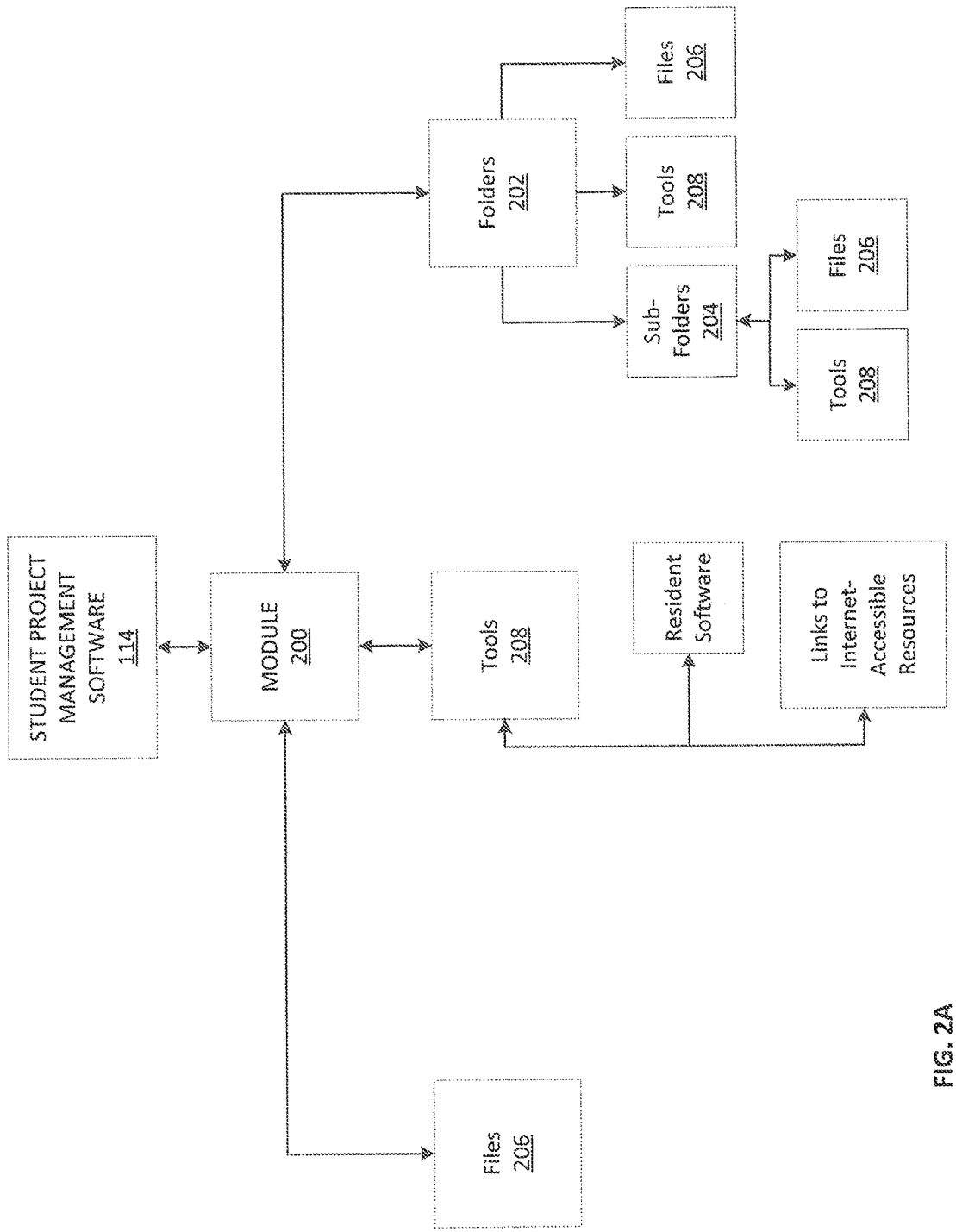
FIGS. 2A and 2B are graphical representations of the hierarchical relationship between modules, folders, subfolders, and files in the student project management software.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Disclosed and described herein are methods and system for student project management. As shown in FIG. 1, one embodiment of the system is comprised of modules. Each of the modules are comprised of software and/or hardware components. The modules may be configured to operate on a singular platform or operate across multiple platforms. Platforms can be thought of as processor-based hardware systems. Each platform may have different and distinct operating systems, or one platform may have the same operating system as one or more other platforms. For example, one platform may comprise a laptop computer operating a Windows-based operating system. Another platform can be a laptop computer operating on an IOS-based operating system. Yet other platforms can be tablet computing devices operating, for examples, Windows, IOS or Android-based operating systems. Similarly, other platforms can be cellular/smart telephones operating, for examples, Windows, IOS or Android-based operating systems. The platform operating components of the disclosed systems and methods should not be considered to be limiting to the embodiments of the disclosed invention as the methods and systems are not limited to specific platforms.

FIG. 1 illustrates an embodiment of a student project management system comprising a plurality of modules. For example, the modules can comprise a Courses module 102, an Extra-Curricular module 104, an Educational Goals module 106, a Life module 108, a Social module 110, and a Calendar module 112. The listed modules are exemplary both in number and function and more or fewer modules may be encompassed within embodiments of the invention. As most activities associated with the modules are related to dates and times, generally all of the modules interact with the Calendar module 112 so that a master calendar can be maintained and updated for the student. Sensitive information about the student such as age, address, telephone number, social security number, medical information, credit/ debit card information, banking information, etc. can be protected through encryption and other forms of data protection such as secure socket layers (SSL) and the like. As noted, in various embodiments, there may be more or fewer modules than shown in FIG. 1.

At the core of the described embodiment is the student project management software 114. This software may operate on one or more of the platforms that comprise embodiments of the system. The student project management software 114 interacts with and controls each of the modules described herein. In one aspect, the student enters information about himself or herself into the student project management software 114. Such information can include the student's name, address, name and address of the school the student is attending, any identifier such as a student number that has been assigned to the student by the school, financial/banking information, passwords, and the like. As noted above, sensitive information can be protected by encryption or other forms of data protection. Any information from the student project management software 114 that is needed by any of the modules is populated to the modules from the student project management software 114. In this way the information only has to be entered once and can be maintained in one location so that changes are automatically updated throughout the entire system.

Figure 2B:
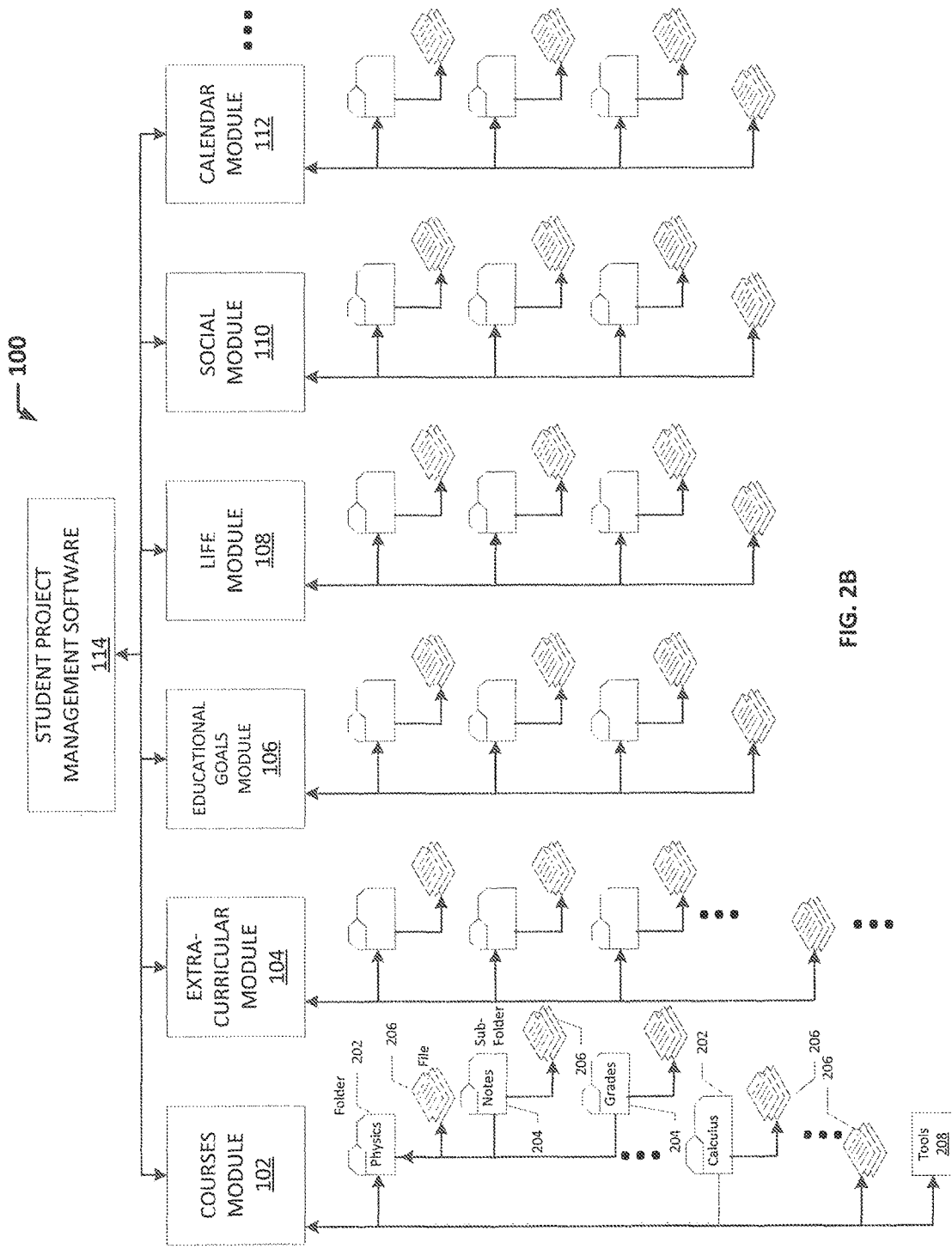

FIGS. 2A and 2B are graphical representations of the hierarchical relationship between modules 200, folders 202, sub-folders 204, and files 206 in the student project management software 114. It is to be appreciated that there can be different numbers of modules, folders, sub-folders, and files in various embodiments of the invention from that illustrated in FIGS. 2A and 2B. As shown in FIG. 2A, the general hierarchical arrangement is that the student project management system 100 is comprised of one or more modules 202. Each module can be further comprised of one or more of folders 204, tools, 208 and files 206. Files 206, as the name implies, are data stored in files in various types of formats. For example, Word™ documents, .pdf files, text files, image files (e.g., .png, .jpeg, etc.) and the like comprise files 206. Similarly, files 206 can be hyperlinks to data and files not local to the system can also comprise files 206. Tools 208 can be resident software for executing certain tasks (e.g., software for creating citations of a references, software for creating a critical path for a project, etc.), or tools 208 can comprise links or calls to Internet-accessible resources such as search engines (e.g., Google™, Bing™ etc.), on-line homework or test resources (e.g., Blackboard™), and other on-line resources that the student may want or need to use. Folders 202 are locations for storing specific course or project related information (files 206), tools and resources 208, and sub-folders 204. For example, a student may have a folder 202 for each of his or her courses that he or she is currently enrolled, and then have sub-folders 204 for each course for homework, notes, projects, etc. related to the specific course. Likewise, each sub-folder 204 may contain files and/or tools specific to the topic of the sub-folder.

FIG. 2B is a more detailed version of a specific implementation of the student project management system 100. In this implementation, the student management software 114 interacts with six modules, a Courses module 102, an Extra-Curricular module 104, an Educational Goals module 106, a Life module 108, a Social module 110, and a Calendar module 112. As described in reference to FIG. 1A, each module 200 can further be comprised of folders 202, files 206, and tools 208. As described above, each folder 202 can also be comprised of sub-folders 204, files, 206 and tools 208.

Referring to FIGS. 1 and 2B, one module comprises a Courses module 102. In this module, a student can identify all or some of the courses that the student is currently enrolled in or plans to take in a separate course folder 202. Each course folder 202 can contain information such as the instructors name, email address, telephone number, etc., as well as information such as the syllabus and grading scale for that course. If the school has an online portal for that course, the course folder 202 can be linked with that portal to populate the course folder with information such as current grade, grades on particular assignments, upcoming quiz and test information, and the like. If the school does not have an online portal, then that information can be entered manually into the course folder 202. The course folder 202 may also be associated with tools 208. For example, based upon the grading rubric for a course, the student can also perform "what if" analysis. For example, if the grading rubric for a particular course is 10 percent homework, 10 percent end of year project, 30 percent quizzes, and 50 percent in-class tests, then the student can determine based on work completed to date what that student needs to score in each of homework, quizzes, tests and project to get a target grade. In one aspect, the target grade is defaulted to an "A" or an equivalent top grade in the course. Similarly, the course folder 202 can be linked with a corresponding grades folder, described below, to track current grades in a particular course and to perform the "what if" analysis described herein. For each course folder 202, there can be one or multiple sub-folders 204. The sub-folders 204 can further include, for example, a notes folder, a homework folder, a grades folder, an assessment folder, a project folder, and the like.

The notes sub-folder for a course folder can be used to store files that comprise class notes for its associated course in multiple and various formats. For example, notes may be stored in a Word™ format, as a .pdf, as an image file (.jpeg, .gif, etc.) or any other file format, or they may be stored as video and/or audio recordings. In one aspect, the system 100 can include tools 208 such as an optical character recognition (OCR) reader such that notes that are in a format that cannot be easily managed with word processing software (e.g., Word™) can be converted from that format to a format acceptable to the word processing software. For example, images can be converted to text files. In one aspect, the OCR software is able to recognize handwriting and convert that to a file format acceptable to word-processing software. Likewise, the system 100 can include tools 208 such as word-processing software and the notes can be entered directly into files in the notes folder using, for example, a keyboard or a program that converts audio into text.

The homework sub-folder for a course folder can be used to store files that comprise homework assignments for its associated course in multiple and various formats. Further, the homework sub-folder can be associated with a tool 208 such that homework that is assigned by the course instructor can be entered along with a required completion date. The homework completion date can be automatically populated to the Calendar module 112 (described herein). Further, the student can enter an estimate of the time (days, hours, etc.) needed to complete the homework assignment by the required date, and the Calendar 112 can automatically set a date/time to begin the homework. The Calendar 112 can also adjust for multiple homework assignments so that the same time will not be simultaneously allocated for two (or more)

homework assignments. Relatedly, the Calendar can be set up such that the student's time to work on homework is designated in the Calendar. For example, the student may allocate 7:00 p.m. until 11:00 p.m. during the week and from 5:00 p.m. until 11:00 p.m. on weekends as designated times to work on homework assignments. As homework assignments are entered into or downloaded into the system 100, the designated homework time is filled providing the student with a schedule for completing their assignments. Further, the Calendar 112 can automatically adjust if homework assignments are not completed in the anticipated amount of time or if they are completed more quickly than anticipated.

The homework sub-folder can also contain tools 208 such as automatic citation-generating software. For example, a user can access an electronic book or published information that is stored in the homework sub-folder or that is accessible from the homework sub-folder using, for example, an on-line reader tool. The citation-generating software can create a citation for the reference that can be cut and pasted into word processing software or that can automatically populate the word-processing software. Similarly, direct quotes from electronically accessible references can be generated and properly formatted and cited. These quotes can also be automatically populated to word-processing software. Additional tools 208 available and associated with the homework sub-folder can include manuals of style for writing, thesaurus and dictionaries (either stored locally on the system 100 or links to Internet resources), and any other tools to help the student complete their homework in an accurate, effective and efficient manner. The tools 208 can also include the ability to communicate with a teacher about the homework including quick links to video conferencing technology (e.g., Skype, Facetime, etc.) that is pre-populated with the teacher's contact information, email and/or text links that allow the student to quickly contact the teacher to discuss aspects of the homework including sharing files or images associated with the homework. Such correspondence with the teacher can be archived in the system 100. Correspondence with teachers such as emails, texts, recorded video conferences or teleconferences can be stored in the homework folder and associated with certain homework items. Further, the teacher can be asked to annotate or comment on homework assignments and such annotations or comments can be stored in the homework folder.

As noted, the homework folder can be used to store or access electronic books, including electronic textbooks. The system 100 can be used to annotate their on-line textbooks, save important quotes and highlights from the textbook so that they are easier to access while writing a paper or creating a study guide, and the like.

One homework tool can be a notification tool. Alerts can be sent to the student and/or other designated persons in the form of texts, emails, phone calls, etc. to alert the student or other person(s) of upcoming homework completion dates. Further, in one aspect, the student can track percentage complete of the homework assignment such that any alerts sent to the student and/or other person(s) will indicate the remaining work to be done, the work that has been done, or both. Alerts can be set to change in frequency and form (i.e., text, emails, telephone calls, etc.) as the due date/time approaches. Further, the student project management software 114 can include a user-adjustable "dashboard" which can use "gas gauge" type icons or other graphical representations to track individual homework assignments, projects, tasks, and the like. Selecting (e.g., clicking) on an icon can all a user to drill down into the actual homework assignment, project, etc. Similarly, when the percentage complete of the homework reaches 100 percent prior to the due date, the system can be configured to stop sending alerts and/or to remove the icon representing that homework from the dashboard.

Referring again to FIG. 1 and FIG. 2B, a course folder 202 may also include a grades sub-folder 204. As with the homework sub-folder, the grades sub-folder may be associated with tools 208 and files 206. In this folder, grades received in courses can be input to track progress. Information from the grades folder can be used to populate the "what-if" analysis tool described in relation to the tools 208 of the courses folder. If the school has an on-line grading system (e.g., Aspen™, etc.), grades can be downloaded to the grades sub-folder. Once downloaded, the on-line grades can be compared to those entered by the student into the grades sub-folder to verify that both systems are in agreement. Further, the grades sub-folder can be used as a driver for alerts to the student and/or other designated persons. For example, when a grade is below or above defined thresholds, alerts can be sent to the student and/or other designated persons (e.g., parents, teachers, tutors, etc.).

Referring again to FIG. 1 and FIG. 2B, a course folder 202 may further comprise an assessment sub-folder 204. The assessments sub-folder provides tools 208, files 206 and (optionally) sub-folders 204 to help a student prepare for tests and/or quizzes in the courses identified in the courses folder. This sub-folder can help the student pull together notes and homework from the respective notes and homework folder for the course in which the test will be given. For example, the student can open a sub-folder for an upcoming test. In one example, the student can input the date of the test and the materials that it will cover (identified by date ranges, keywords, teacher, or other identifying measures), and the system 100 will automatically provide a list of materials that are either stored or linked in the system that may be associated with the upcoming test. The student can then select or deselect items in the list to be included in the test sub-folder. In that test sub-folder, the student can create links to all the notes, quizzes and subject matter associated with that test. Further, the student can download or link to resources external to the system 100 such as on-line study-guides, outlines created by friends, classmates or others that have taken the course, online systems for creating flash cards (e.g., Quizlet™, etc.), practice tests, YouTube™ videos or other on-line or shared videos, and the like. If the student has access to an electronic textbook, that portion of the textbook associated with the test can be downloaded or linked to the test folder. In this way, the student can build an electronic "packet" in the test sub-folder that has all the materials available to prepare for the upcoming test. Similar to homework (see above), the upcoming test date for a course can be automatically populated to the Calendar module 112 (described herein). The student can enter an estimated study schedule (days, hours, etc.) needed to prepare for the test, or the system 100 can automatically generate a schedule based on availability as determined from the master Calendar. Time allocated to studying for the test can be entered into the system 100 or a timer can be set as the student studies. Also, as with homework, the system 100 can be set to send alerts to the student and/or others to make sure he or she is adequately preparing for the test, or to let others know that the student needs to be studying. Video conferencing can also be a tool 208 available through the assessment sub-folder so that students may study together.

Referring yet again to FIG. 1 and FIG. 2B, a course folder 202 may further comprise a project sub-folder 204. Here, a student can create a new project sub-folder and share it with peers. Files 206 can be hosted in a web-server or in the cloud so that multiple persons can simultaneously see and edit a single document. For example, multiple users may be able to see and edit a Word™ document or a PowerPoint™ file. Further, the project-sub folder can be provided with tools 208. For example, the project creator can identify others (project members) such as classmates, teachers, advisors, etc. that can participate in a project and what their roles are. Tasks that comprise the project can be assigned to the others with one or both of a start and end date of an amount of time allocated to complete the task. Notifications in the form of texts, emails, phone calls, etc. can be sent to each person assigned a task in a project that identifies their task and provides the start and end date of an amount of time allocated to complete the task. Project members can be provided access to the Calendar for the project. In one aspect, the Calendar only shows dates associated with the project that the person is assigned. The project calendar can be hosted by the web server or the cloud so that it can be accessed by all project members. Project members may be asked to agree or commit to the assigned task by, for example, sending a text to a specific number, clicking on a button in an email, providing an electronic signature, replying to or sending an email, or the like. Once the tasks are assigned and accepted, a timeline can be created for completion for the project. The timeline can include a critical path. Task durations and/or start and end dates may be automatically adjusted to make sure that the tasks are completed in order as needed for the completion of the project by the designated date.

The project sub-folder can include a tool 208 that allows the project creator to be able to see when peers are online and what they're working on. The user can communicate with the project members via text, email, phone, video conference, web conference, over social media, and the like. The calendar can be set up keep track of tasks as they are completed and as they near their due date. Notifications can be sent to one or more of the project members to advise them of the status of their tasks and/or the project as a whole. The calendar can constantly monitor and advise when dates slip because of tasks not being completed or because of changes to the project. Task members can interact with the calendar to enter comments about their tasks and to log important deadlines or schedules As noted above, the system 100 can include additional modules. These modules can include, for example, an Extra-Curricular module 104, an Educational Goals module 106, a Life module 108, a Social module 110, and a Calendar module 112.

The Extra-Curricular module 104 can include folders 202, files 206, tools 208 and subfolders 204 related to extra-curricular activities such as sports, band, drama, arts, volunteer experience, clubs, and the like. For example, the extra-curricular module 104 can include a folder 202 for a club such as the debate team. The debate team folder can include files that identify other members of the debate team, their contact information (e.g., email, telephone number, etc.), their areas of expertise and the like. The debate team folder can also include files that can be used for studying particular subject matter, profiles of competitor teams, competition schedules, and the like. Tools 208 for the debate team can include online study resources, links to video repositories for debates, and the like.

Another tool 208 that can be included in an Extra-Curricular module 104 is a community-service organizer that can track and log time spent on community-service projects, update the educational goals module 106 (described below) with this information, use community-service and volunteer interests to search multiple databases for community-service and volunteer opportunities to match the student.

The Educational Goals module 106 can include folders 202, files 206, tools 208 and subfolders 204 that allow a student to set educational goals and measure progress toward achieving those goals. For example, the educational tools module 106 may include a tool that allows a student to either enter or download admission requirements to a specific university or several universities and/or colleges. For example, a high school student that wants to gain admission to Harvard can enter available profile information for students that have been admitted to Harvard such as ACT and/or SAT scores, high school curriculum and grades, number of AP, IB and/or honors courses and grades, extra-curricular activities such as community service, club membership and leadership, work experience, and other factors that are used by the school for admission. An admission profile can be custom-developed for each school, as different schools have different factors that are considered for admissions. Each factor can be individually weighted if the school places particular emphasis on some factors over others. The admission factors for school can be compared to the student's performance and activities to provide an indicator of the student's likelihood of being admitted to each of the schools identified in his or her list of schools. In one aspect, information about the student can automatically and dynamically populate the educational goals tool. Such information may come from other modules of the student project management system 100. For example, if a student does well on a final exam in an AP calculus course and the results become part of the courses module 102, then the results are dynamically auto-populated to the educational goals tool and the likelihood of gaining admission into the student's desired schools may increase. Similarly, if the student becomes president of his or her high school's student government association or makes the varsity baseball team, these achievements may dynamically and automatically auto-populated from the extra-curricular module 104 to the educational goals tool in the educational goals module 106. Likewise, community service and volunteer activities and time spent can be auto-populated from the extra-curricular module 104 to the educational tools tool to be included in the student's profile. In one aspect, the likelihood of gaining admission to a desired school can be graphically represented on a graphical user interface using, for example, bars, colors, a "gas gauge" style representation, etc.

Similar to gaining admission into a college or university form high school, the educational goals module can be used by the student to manage his or her opportunities to gain admission into a specific college of a university and/or to gain admission into a professional program such as medical, veterinary, law school and the like. A profile template can be prepared by the student that identifies the factors for admissions and how they are weighted. As the student matriculates, information from other modules of the student project management system 100 can dynamically and automatically auto-populate into the educational goals tool, which can provide the student with a real-time snapshot of his or her likelihood to get into the school and/or program that they desire.

Further, the educational goals module 106 can be used to store results of test such as ACT, SAT, GRE, LSAT, MCAT, and the like. Separate folders can be set up for each of these tests. Similar to the courses folders described in the courses module 102, the student can create a study "packet" for each test with files and tools related to each test, as well as tracking results. The student can have tools for each test that link to on-line and resident study resources such as quizzes, old tests, and the like. The student can access these tools form any platform. For example, the student while waiting for a ride can access the student project management software system 100 using his or her smart phone and take a practice quiz on an SAT subject. The results can be stored in the SAT folder and the student's progress toward preparedness for the test can be recorded. A study schedule can be established for each test, and the student can receive prompts and alerts regarding their studying and the time left before the test date. Results of the tests can dynamically and automatically auto-populate the educational goals tool.

The Life module 108 and the Social module 110 can be optional to the student project management system 100. These modules can help a student manage their activities and interests outside of educational pursuits. For example, all of the student's social media accounts (e.g., Facebook, Twitter, SnapChat, Instagram, etc.) may be access through the social module 110. The life module 108 can have folders to help the student manage their finances and budgeting, a bills and banking folder and tools for accessing the student's bank account and paying bills on-line, a vacation/trip-planning folder with tools, files and links, folders to help the student with non-education exams and certifications for example, if the student wants to become SCUBA certified, and the like. For example, the life module 108 can also include folders for friends and family. The folder can include information such as contact information, important dates such as birthdays, photos, and the like. The student can set up automatic reminders to send presents, e-cards, and the like to designated persons. The Life module 108 can interact with the calendar module 112 so that events such as vacations, holidays, travel, and the like can be scheduled and considered when planning events and activities for the student.

The Calendar module 112 interfaces with all the other modules and designated folders of the modules of the student project management software. Here, a master schedule is developed that is custom and personal for the student. It includes not only the dates of upcoming activities (tests, trips, project deadlines, etc.), but it also includes schedules for preparing for different tests, completing projects, and the like. The calendar module can be configured to send alerts such as texts, emails, phone calls and the like to the student, but also to parents, guardians, teachers, and others that may have interest in the student's progress in academic and non-academic pursuits.

The calendar function can include a master, comprehensive calendar that includes all the activities of the student. The student can create a critical path schedule for each activity on the calendar that allocates study time, practice time, and the like leading up to the activity. In one aspect, the student can allow the calendar module to create a study schedule for an upcoming test. The study schedule may be dynamic and flexible. For example, if the test is three weeks in the future, the automatically-created schedule may be such that the student is allocates less study time initially and more study time as the test date nears. This schedule can automatically update if the student misses allocated study time, does not believe he or she needs to full amount of time allocated to the test, the student believes they need more time for studying than what was initially (automatically) allocated, the test is moved, canceled or rescheduled, or other events occur that effect the initial schedule.

Further, the calendar module can push specific calendars and schedules to persons associate with a specific activity. For example, if the student was involved with a group project, each member of the group could be pushed a calendar and schedule that is specific to that person and their role, and each group member could receive a project calendar that shows the schedule for each member of the group. Activities that are calendared can be assigned priorities so that a critical path can be determined for the student's time and activities and time allocated to activities and events may be adjusted based on assigned priorities. Similarly, timelines and activities can be pushed to members of other groups. For example, members of a baseball travel team can be pushed appointments to pay registration fees, make hotel arrangements and the like.

The calendar module interacts with all the other modules of the system. Projects, courses, activities and the like are schedule through respective modules into the calendar. The calendar provides the student with a snapshot of any time period—day, week, month, etc. It allows the student to efficiently and effectively allocate time to course work as well as extra-curricular, family and social events. Tools associated with the calendar module 112 can include critical path determination, pushing calendars and timelines out to specified person or persons, prioritizing activities for critical path management and adjustment, automatic scheduling, and the like.

Figure 3:
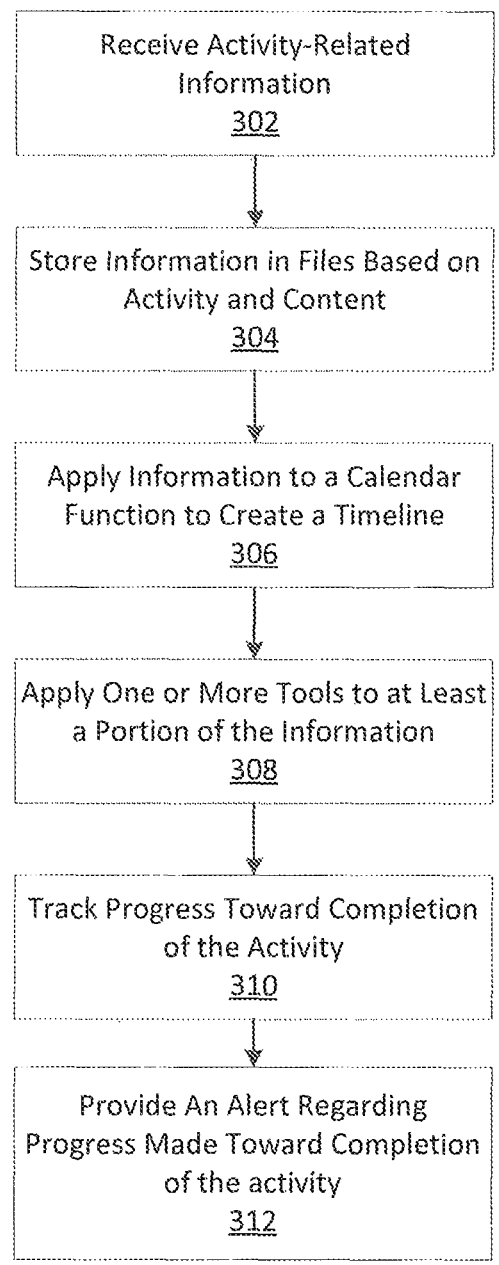
FIG. 3 is a flowchart illustrating a method of student activity management.

Therefore, disclosed herein is a method of student activity management. The disclosed method may advantageously be illustrated by use of a flowchart, such as the flowchart of FIG. 3. As shown in FIG. 3, at 302 a plurality of information is received, wherein the received information is related to one or more activities of a student in an educational system. At 304, at least a portion of the information is stored in one or more files, wherein the information is stored based on the activity the information is related to and the content of the information. At 306, at least a portion of the received information is applied to a calendar function, wherein the at least a portion of received information applied to the calendar function is used to create a timeline for completing at least one activity of the student. At 308, one or more tools are applied to at least a portion of the information. For example, if the information is related to scores received in relation to assignments and tests in a course, then the tool can comprise an analysis tool that applies the scores to a grading rubric for the course and lets the student know what they need to score on remaining tests and assignments in order to obtain a desired grade (e.g., an "A"). At 310, progress is tracked toward completion of the at least one activity, and at 312, alerts are provided to at least the student regarding the progress made toward completion of the at least one activity As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 4:
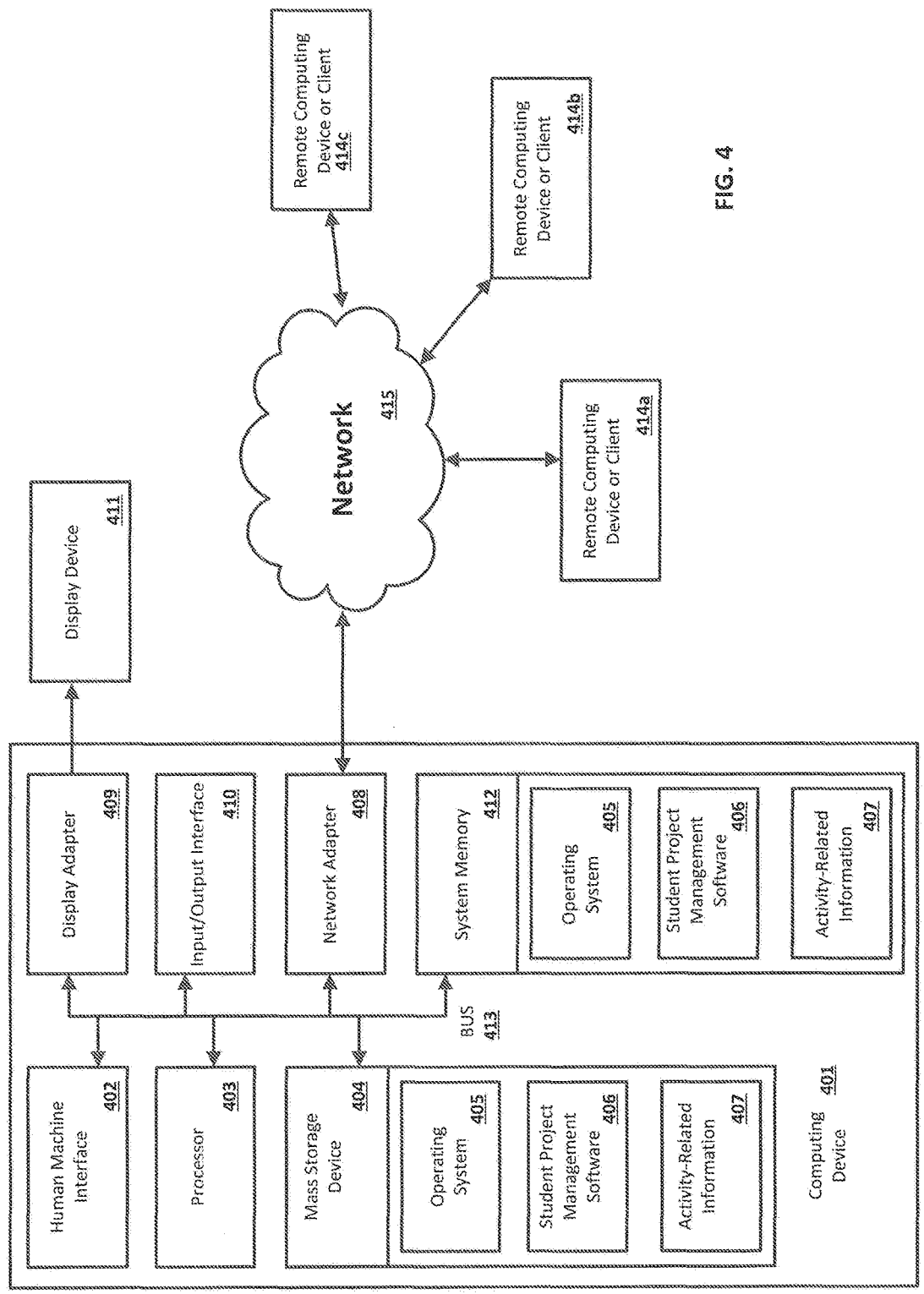
FIG. 4 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the student project management Software 406 as illustrated in FIG. 4 and described below. In one exemplary aspect, the units can comprise a computer 401 as illustrated in FIG. 4 and described below.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, tablets, smart phones, and multiprocessor systems. Additional examples comprise programmable consumer electronics, network PCs, mini-computers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, Student project management software 406, Activity-related information 407, a network adapter 408, system memory 412, an Input/Output Interface 410, a display adapter 409, a display device 411, and a human machine interface 402, can be contained within one or more remote computing devices 414a,b,c at physically separate locations, connected through buses of this form, including wireless buses, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as Activity-related information 407 and/or program modules such as operating system 405 and Student project management software 406 that are immediately accessible to and/or are presently operated on by the processing unit 403.

In another aspect, the computer 401 can also comprise other removable/non-removable, volatile/non-volatile computer storage media. By way of example, FIG. 4 illustrates a mass storage device 404 which can provide non-volatile storage of computer code, computer readable instructions, data structures, program modules, and other data for the computer 401. For example and not meant to be limiting, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and Student project management software 406. Each of the operating system 405 and Student project management software 406 (or some combination thereof) can comprise elements of the programming and the Student project management software 406. Activity-related information 407 can also be stored on the mass storage device 404. Activity-related information 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 403 via a human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409 and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown) which can be connected to the computer 401 via Input/Output Interface 410. Any step and/or result of the methods can be output in any form to an output device. Such output can be any form of visual representation, including, but not limited to, textual, graphical, animation, audio, tactile, and the like.

The computer 401 can operate in a networked environment using logical connections to one or more remote computing devices 414*a,b,c*. By way of example, a remote computing device can be a personal computer, laptop device, tablet, smart phone, portable computer, a server, a router, a network computer, a peer device or other common network node, and so on. Logical connections between the computer 401 and a remote computing device 414*a,b,c* can be made via a local area network (LAN) and a general wide area network (WAN). Such network connections can be through a network adapter 408. A network adapter 408 can be implemented in both wired and wireless environments. Such networking environments are conventional and commonplace in offices, enterprise-wide computer networks, intranets, and networks 415 such as the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of Student project management software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of student activity management comprising:
receiving information related to one or more activities of a student at a computing device used by the student, the received information from a network that communicatively couples the computing device used by student to other computing devices that are used by other students and teachers in an educational system;
storing, based on the information's content, the information in one or more modules, the modules comprising a courses module, an extra-curricular module, and educational goals module, a life module, a social module, and a calendar module, wherein each module includes at least one tool for executing a task specific to each module;
creating a master calendar for the student by applying information obtained from the courses module, the extra-curricular module, the educational goals module, the life module, and the social module to a calendar function of the calendar module;
receiving input from the student using a project manager tool of the courses module, the input defining a project and assigning project tasks to each student in a group of students including the student;
creating a project schedule based on the project tasks assigned to each student and each student's master calendar;
sending, to each student in the group of students, a student-specific project schedule that includes the tasks assigned to each student;
tracking progress made toward completion of the project;
providing text message, email, or phone call alerts to each student in the group of students regarding the progress made toward completion of the project, wherein the frequency of the text message, email, or phone call alerts increases as the project's due date approaches.

2. The method of claim 1, wherein the educational goals module includes a tool that allows the student to enter an educational goal and track progress toward and likelihood of success of accomplishing the educational goal.

3. The method of claim 2, wherein the educational goal is admission to a desired college or university.

4. The method of claim 2, wherein progress toward and likelihood of success of accomplishing the educational goal is visually displayed to the student via a graphical user interface of the computing device used by the student.

5. The method of claim 2, wherein information from one or more other modules is used to automatically determine and update progress toward and likelihood of success of accomplishing the educational goal.

6. The method of claim 1, wherein the courses module includes a tool that allows the student to videoconference with an instructor.

7. A system for student activity management comprising:
a computing device used by a student, wherein the computing device is communicatively coupled, via a network, to other computing devices used by other students and teachers in an educational system, and wherein the computing device comprises:
a memory, wherein the memory comprises computer-executable code; and
a processor for executing the computer-executable code, said computer-executable code causing the processor to:
receive information related to one or more activities of a student;
store, based on the information's content, the information in one or more modules, the modules comprising a courses module, an extra-curricular module, an educational goals module, a life module, a social module, and a calendar module, wherein each module includes at least one tool for executing a task specific to each module;
create a master calendar for the student by applying information obtained from the courses module, the extra-curricular module, the educational goals module, the life module, and the social module to a calendar function of the calendar module;
receive input from the student using a project manager tool of the courses module, the input defining a project and assigning project tasks to each student in a group of students including the student;
create a project schedule based on the project tasks assigned to each student and each student's master calendar;
send, to each student in the group of students, a student-specific project schedule that includes the tasks assigned to each student;
track progress made toward completion of the project;
provide text message, email, or phone call alerts to each student in the group of students regarding the progress made toward completion of the project, wherein the frequency of the text message, email, or phone call alerts increases as the project's due date approaches.

8. The system of claim 7, wherein the educational goals module includes a tool that allows the student to enter an educational goal and track progress toward and likelihood of success of accomplishing the educational goal.

9. The system of claim 8, wherein the educational goal is admission to a desired college or university.

10. The system of claim 8, further comprising a graphical user interface in communication with the processor, wherein progress toward and likelihood of success of accomplishing the educational goal is visually displayed to the student on the graphical user interface.

11. The system of claim 8, wherein information from one or more other modules is used to automatically determine and update progress toward and likelihood of success of accomplishing the educational goal.

12. The system of claim 7, wherein the courses module includes a tool that allows the student to videoconference with an instructor.

* * * * *